United States Patent [19]
Polak et al.

[11] 4,208,264
[45] Jun. 17, 1980

[54] SENSOR FOR DETERMINATION OF THE POLARIZATION POTENTIAL AND/OR THE INTERFERENCE OF METAL STRUCTURES BURIED IN AN ELECTROLYTE IN A CURRENT FIELD

[75] Inventors: Josef Polák, Prague; Josef Mrazek, Roudnice, both of Czechoslovakia

[73] Assignee: Chemoprojekt, Prague, Czechoslovakia

[21] Appl. No.: 840,013

[22] Filed: Oct. 6, 1977

[30] Foreign Application Priority Data

Oct. 21, 1976 [CS] Czechoslovakia ............... 6084-76
Dec. 30, 1976 [CS] Czechoslovakia ............... 8850-76

[51] Int. Cl.² ........................................... G01N 27/46
[52] U.S. Cl. ............................ 204/195 C; 324/65 CR
[58] Field of Search .................. 204/1 C, 195 C; 324/65 CR; 73/86

[56] References Cited

U.S. PATENT DOCUMENTS

| | | | |
|---|---|---|---|
| 2,878,354 | 3/1959 | Ellison | 201/63 |
| 3,660,249 | 5/1972 | Townsend | 204/1 T |
| 3,999,121 | 12/1976 | Taylor, Jr. | 324/65 CR |
| 4,051,436 | 9/1977 | Weir, Jr. | 324/102 |
| 4,080,565 | 3/1978 | Polak | 324/71 R |

*Primary Examiner*—John H. Mack
*Assistant Examiner*—William Leader
*Attorney, Agent, or Firm*—Burgess, Ryan and Wayne

[57] ABSTRACT

The sensor according to the invention has at least one metal electrode of the same material as the measured structure and a permanent reference electrode. The measuring surface area of the metal electrode satisfies the relation $2.0m^2 \geq S \geq 0.1cm^2$, where S is the measuring surface of the electrode. The sensor is buried in the ground at a distance L from the measured structure, said distance L satisfying the relations $20m \geq L \geq 0.1m$ and $L \geq 6R$, where R is the radius of a hypothetical sphere having the same surface area as the measured non-linear structure, or the radius of a cylindrical linear structure such as a pipeline.

8 Claims, 8 Drawing Figures

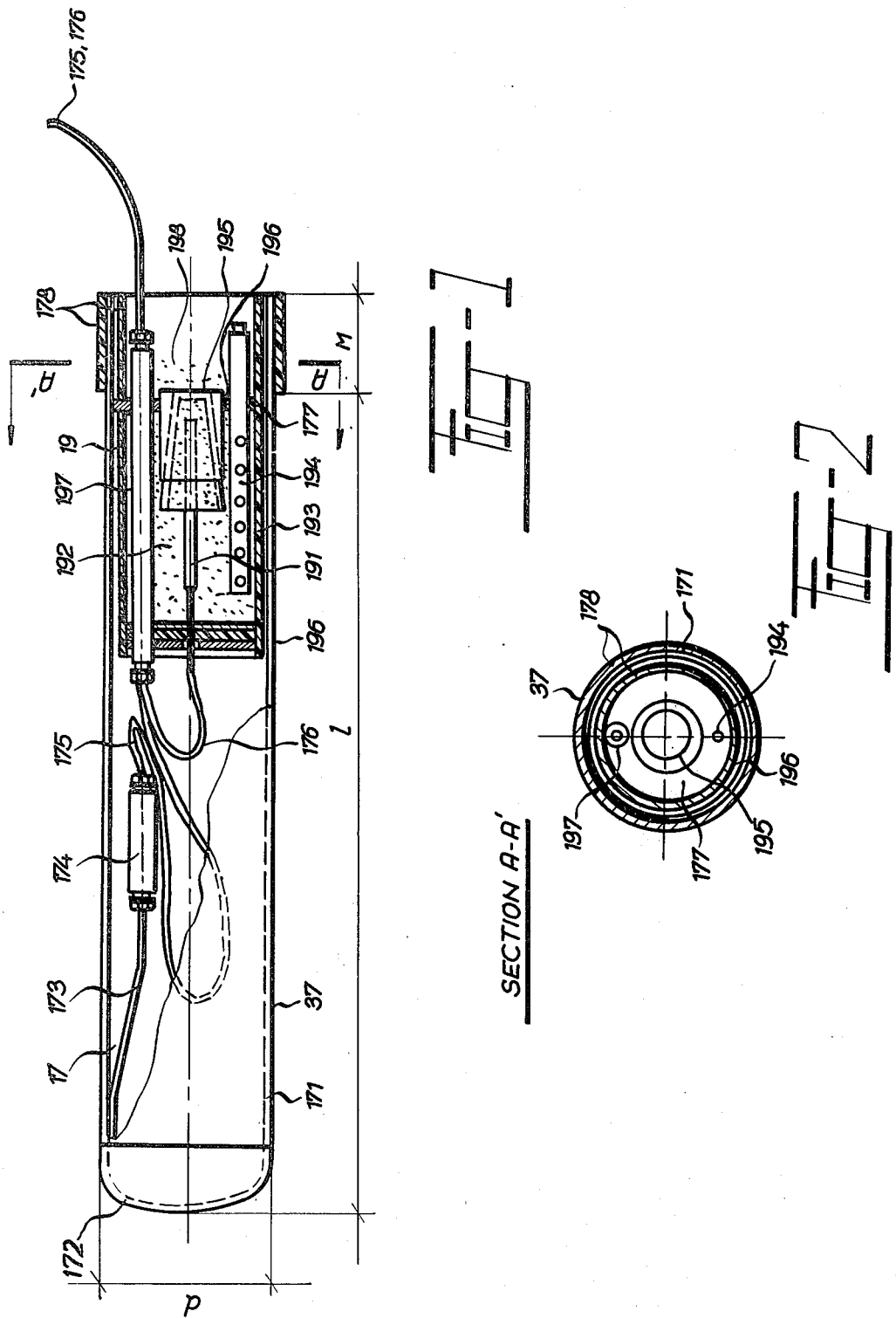

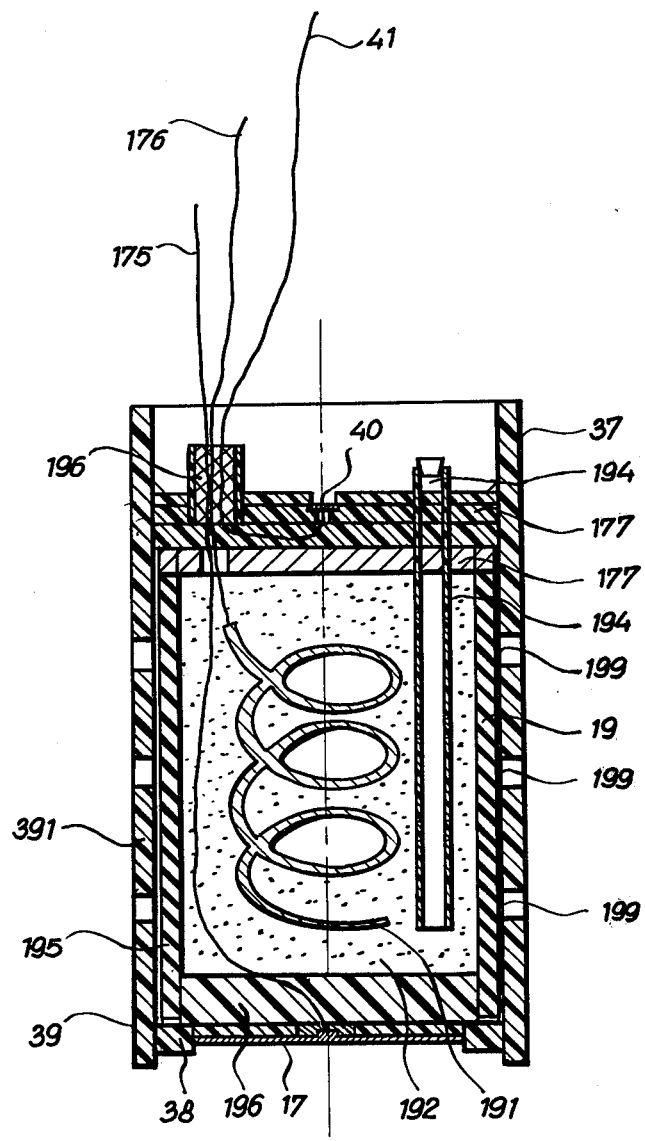

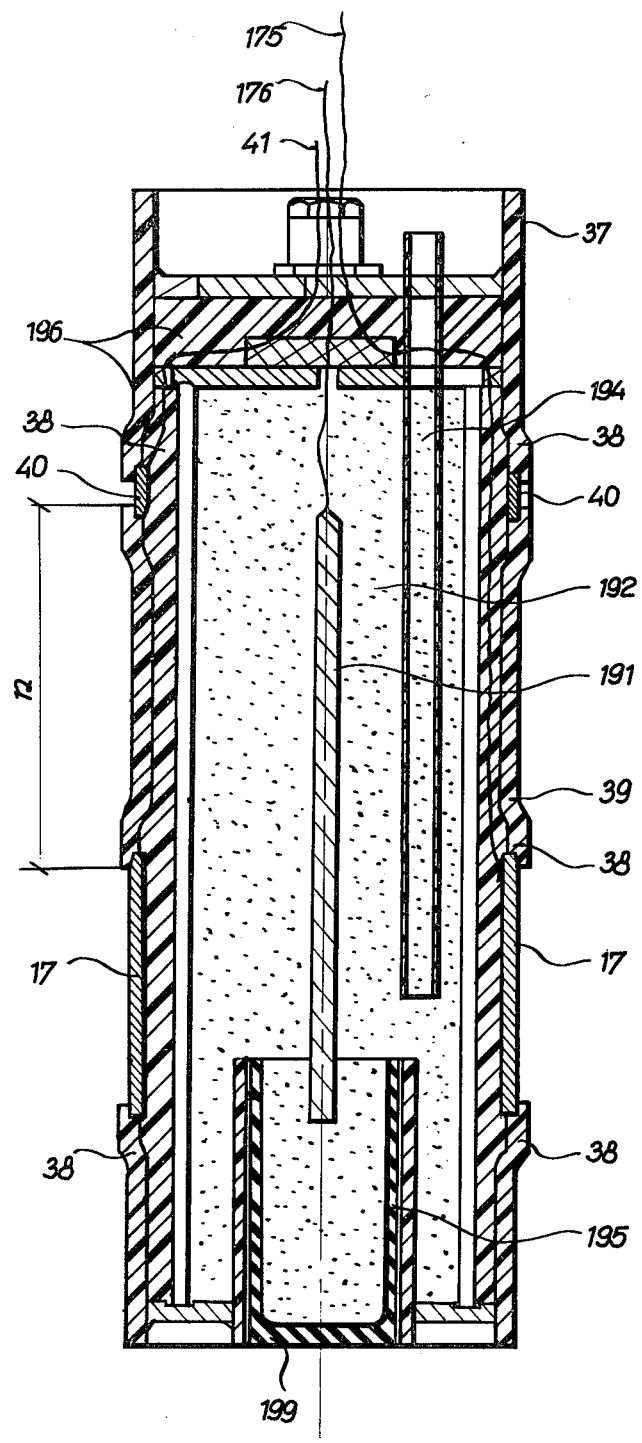
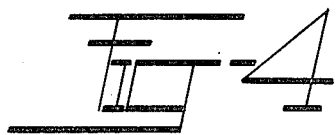

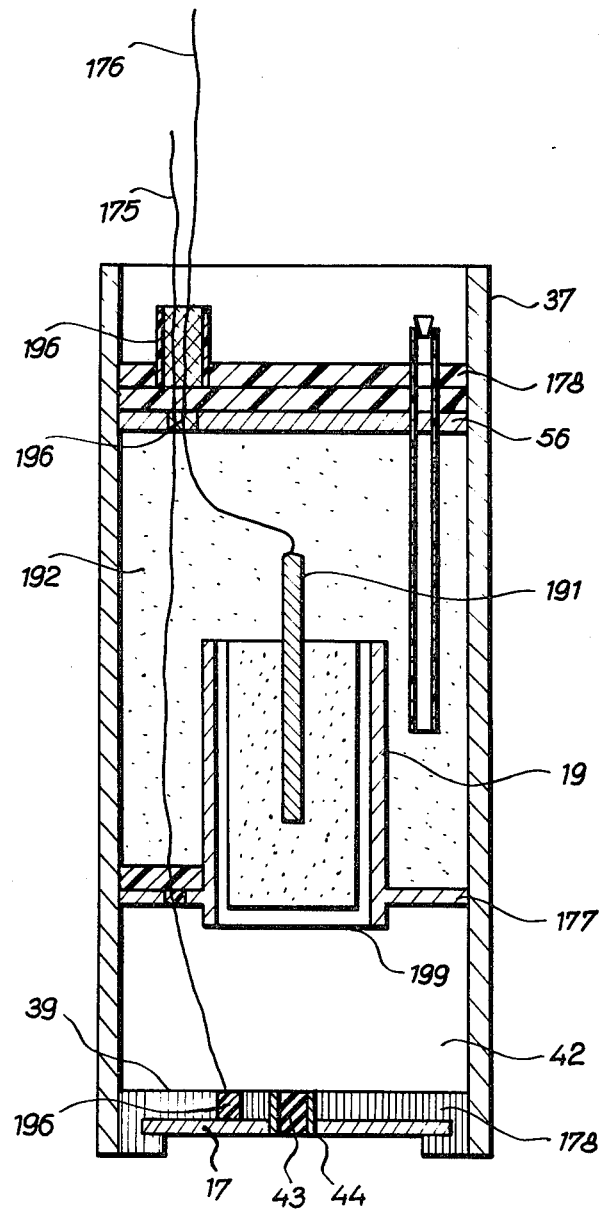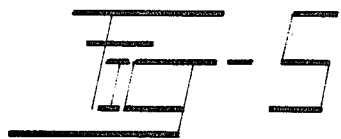

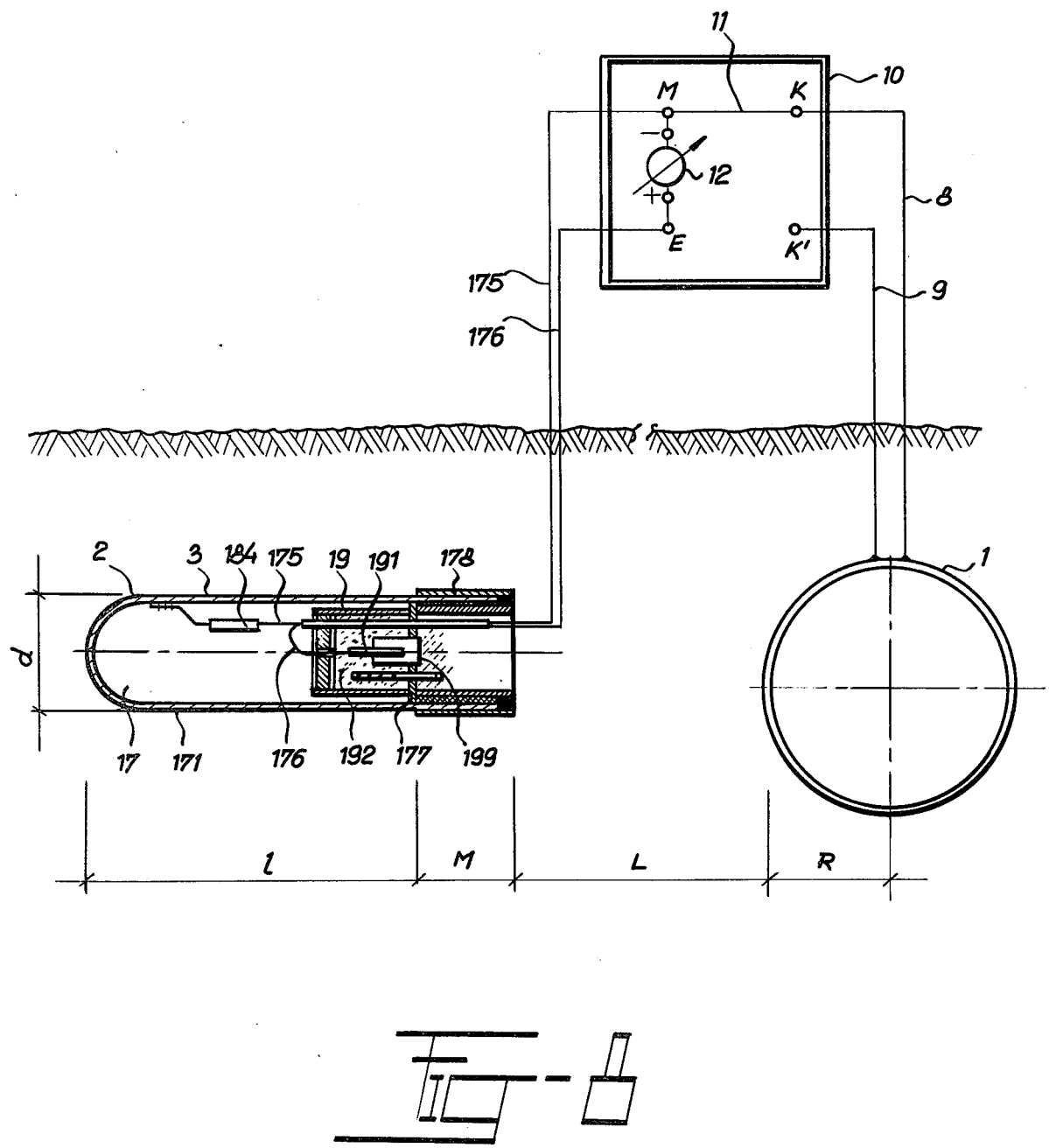

SENSOR FOR DETERMINATION OF THE POLARIZATION POTENTIAL AND/OR THE INTERFERENCE OF METAL STRUCTURES BURIED IN AN ELECTROLYTE IN A CURRENT FIELD

BACKGROUND OF THE INVENTION

This invention relates to a sensor for determination of polarization potential or interference of structures buried in an electrolyte in a current field.

DESCRIPTION OF PRIOR ART

At the present time measurements of polarization potential and determinations of the interference between crossing cathodically protected metal structures and non-protected metal structures by the switch-off method in the field are subject to a substantial degree of error, as a substantial part of the measured values consists of I-R voltage drop. Even where the polarization potential sensing unit simulating the bare surface of the metal structure, previously designed by Applicants, proved to be fully satisfactory in practice, it had the disadvantage of being relatively complex in construction and thereby also relatively expensive to manufacture.

PRINCIPLE OF THE INVENITON

As herein described, a sensor is provided having at least one metal electrode of the same material as the measured structure and a permanent reference electrode, the measuring surface area S of the metal electrode satisfying the relation $2.0\ m^2 \geq S \geq 0.1\ cm^2$ and the sensor being buried in the same electrolyte as the measured structure at a distance L from the measured structure, said distance L satisfying the relations $20m \geq L \geq 0.1m$ and $L \geq 6R$, where R is the radius of a hypothetical sphere having the same surface area as the measured non-linear structure or the radius of a cylindrical linear structure such as a pipeline.

The sensor according to the invention may comprise a hollow metal electrode in the form of a cylindrical cavity having two ends and a metal bottom at one end and an insulating shield, likewise cylindrical, at the other end, a permanent reference electrode being accommodated in said cavity. The hollow metal electrode contacts the electrolyte with its bare surface over an area of $200\ cm^2 \leq S_E \leq 2.0\ m^2$, preferably on an area of $0.2\ m^2 \leq S_E \leq 0.8\ m^2$, while the length l of the bare cylindrical surfaces satisfies the relations $2d \leq l \leq 20d$, preferably $4d \leq l \leq 8d$, $M \geq d/2$ and $L \geq 6R$, where d is the diameter of the cylindrical metal electrode, M is the distance from the bottom of the permanent reference electrode to the insulating shield, L is the least distance between the surface of the metal electrode and the surface of the structure with radius R, the condition being that $L_{min} = 5\ m$.

Also herein described is a sensor comprising a permanent reference electrode situated in the proximity of at least one auxiliary metal electrode of the sensor, the material of said metal electrode being identical with or similar to that of the structure and the area S of said metal electrode being in conformity with the condition $1.0\ m^2 \geq S \geq 0.1\ cm^2$, but preferably $1000\ cm^2 \geq S \geq 1\ cm^2$,. The distance b between the sensing area of the permanent reference electrode and the auxiliary metal electrode surfaces complies with the relation $2.0\ m \geq b \geq r/2$, but preferably $30\ cm \geq b \geq 5\ cm$, where r is the radius of the auxiliary electrode with the greater surface area. The auxiliary metal electrodes are accommodated in the proximity of the metal structure at distance L complying with the relation $20\ m > L \geq 0.1\ m$, preferably $5\ m \geq L \geq 0.5\ m$, the closest spacing of the auxiliary metal electrode surfaces being $n \geq 2\ r$, but preferably $n \geq 4\ r$, wherein r is the radius of the auxiliary electrode with the greater surface area.

An embodiment of the sensor of this invention may comprise a carrier in the shape of a cylindrical ring made of dielectric material with auxiliary metal electrodes fixed at either end of said carrier, a permanent reference electrode being accommodated inside the sensor in a manner such that at least one sensing surface of said permanent reference electrode is inside the cylindrical surface of said carrier. Another embodiment of the sensor of this invention may comprise a carrier cylindrical in shape, made of a dielectric material, accommodating auxiliary metal electrodes in the shape cylindrical rings or circular plates, at least one sensing surface of permanent reference electrode being at either end of the sensor.

Still another embodiment of the sensor of this invention may have a permanent reference electrode fitted on one side of a plate-shaped carrier made of a dielectric material, an auxiliary metal electrode being provided on the other side of the carrier. Still another embodiment of the sensor of this invention may have a permanent reference electrode accommodated inside a carrier made of a dielectric material in the shape of a hollow, open-ended polyhedron the external walls of which carry auxiliary metal electrodes.

Yet another embodiment of the sensor of this invention may have a permanent reference electrode mounted inside a carrier shaped as a hollow cylinder of a dielectric material with closed circular bases provided on the outside with at least one auxiliary metal electrode, electrolytically conductive filling being placed between the sensing surface of said permanent reference electrode and the internal surface of said carrier made of dielectric material, and a cylindrically shaped diaphragm with diameter p satisfying the relation $p \geq 2mm$, but preferably $20\ mm \geq p \geq 4\ mm$, being inserted through the whole thickness of an auxiliary metal electrode and of the carrier bottom made of a dielectric material, said diaphragm from the wall of the auxiliary steel electrode and from the carrier bottom with a cylindrical sleeve made of a dielectric material.

IN THE DRAWING

FIG. 1 is a longitudinal sectional view of a sensor according to a preferred embodiment of the invention;

FIG. 2 is a transverse sectional view of the sensor of FIG. 1, taken along the cutting plane A—A';

FIGS. 3 to 5 are longitudinal sectional views of sensors according to alternative embodiments of the invention;

FIG. 8 illustrates the manner in which the sensor of FIG. 1 is connected to a structure with respect to which measurements are to be made.

Figure 6:
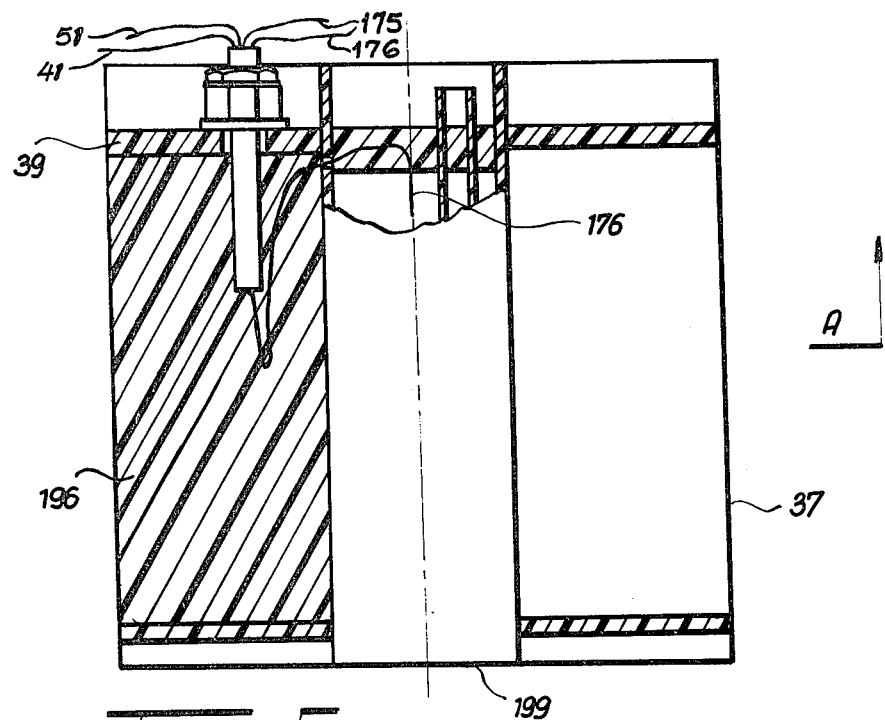
FIG. 6 is a longitudinal sectional view of a sensor according to still another embodiment of the invention.

FIG. 1 shows a section through the sensor 37 of this invention in the plane of its longitudinal axis. The auxiliary metal electrode 17 consists of hollow cylinder 171 made of a steel pipe with an outside diameter of 150 mm and length of bare surface $l=725$ mm which is closed with metal bottom 172, its other end being provided with an electrically non-conductive, water-tight partition 177, for instance a circular polyvinyl chloride (PVC) plate. The partition 177 carries a permanent reference electrode 19 consisting, for instance, of (i) PVC tube 193 with charge 192 which is a mixture of crystalline copper sulfate with sawdust, (ii) copper electrode 191, (iii) perforated flooding tube 194, e.g. a PVC tube with stopper, and (iv) porous vessel 195 made, for instance, of ceramic diaphragm, the tightness of the reference electrode 19 being achieved by sealing with resin 196.

The partition 177 supports an insulating shield 178 with length $M=10$ cm made, for instances, of epoxy-laminate or of two PVC tubes of different diameters, the space between these tubes and the steel tube of hollow electrode 17 being filled with sealing resin 196, said insulating shield 178 being dimensioned to extend beyond the steel pipe 171 of the auxiliary metal electrode 17. The insulated wire 175 is connected to the interior surface of the hollow metal cylinder 171 using cable coupling 174, for instance, a bakelite coupling filled with insulating compound, and metallic bar conductor 173, for instance steel wire, welded to the steel surface of the hollow metal cylinder 171. The insulated wire 176 is connected to copper electrode 191 made, for instance, of 10 mm diameter 99.9% pure copper cylinder. The insulated wires 175, 176 are brought out of the interior of sensor 37 through cable bushing 197 consisting, for instance, of a PVC tube with packing inlets at either end. Inside the insulating shield, a backfill 198 of fine soil, e.g., bentonite, is applied to the measuring surface of reference electrode 19, i.e., to the bottom of poruos vessel 195.

The sensor 37 with total area of metal electrode 17 $S_E = 0.4$ m$^2$ and with length $l = 5d = 785$ mm including the bottom 172 is buried at a depth $h=20$. m at distance $L=5$ m from the surface of the metal structure and at least 8 m from the galvanic anode, the distance of said sensor from the groundbed of the cathodic protection facility being at least 40 m. The minimum distance between the measuring surface of the permanent reference electrode 19 and the bare surface of the auxiliary metal electrode 17 should be equal to the diameter d of the cylindrical surface to permit measurement of the average value of the off-potential.

FIG. 2 shows section A—A' through the embodiment of sensor 37 described above.

The embodiment of the sensor of this invention as illustrated in FIG. 1 and FIG. 2 is advantageous for use with bare steel piping, such as borehole casings and exploitation piping, well casings, pipe casings or even pipelines with poor protective coating. It is also applicable to cathodic protection of tank bottoms or box-type of cylindrical tanks or of bunkers and pits, both existing and newly constructed. The equipment of this invention may also be utilized when investigating the exposure of metal structures to corrosion due to stray current, particularly in the case of existing underground tanks situated in the proximity of d.c.-electrified track systems.

FIGS. 3 through 7 illustrate the sensor 37 of this invention in various modifications where the bare surface of the auxiliary metal electrode 17 simulates small-size gaps or openings in the insulating coating of a metal structure.

In the embodiment of this invention as shown in FIG. 3, the sensor 37 consists of carrier 39 made of a dielectric material, for instance a PVC tube, one end of said carrier being fitted with an auxiliary metal electrode 17 consisting, for instance, of a circular steel plate with area $S=100$ cm$^2$, the other end being provided with an auxiliary metal electrode 40 consisting of a circular steel plate with area $S=10$ cm$^2$. Simulated pipe coating is provided around the two electrodes 17, 40 in the shape of collars 38 made of a dielectric material, such as PVC plates, said collars being fixed to carrier 39 made of the same dielectirc material. Accommodated inside the sensor 37 is a permanent reference electrode 19 consisting, for instance, of copper electrode 191 embedded in charge 192 consisting of a mixture of crystalline copper sulfate and sawdust, a diaphragm 195, for instance a porous ceramic vessel, being applied to the inner circumference of the cylindrical carrier 39 made of a dielectric material and sensing surfaces 199 of the permanent reference electrode 19 being provided on the circumference of the cylindrical carrier 39 in the form of radial holes in said cylindrical carrier. Insulated wire 175 is connected to the auxiliary metal electrode 17, insulated wire 41 being connected to the auxiliary metal electrode 40. Insulated wire 176 is connected to the copper electrode 191. The points of connection and outlet of the insulated wires 41, 175, 176, for instance, insulated cables, brought out of the sensor 37 are provided with insulating layers 196 using, for instance, epoxy-based sealing resins. Moreover, the sensor is furnished with flooding tube 194.

FIG. 4 shows an embodiment similar to that of FIG. 3, the difference being that the auxiliary metal electrodes 17, 40 are situated at the perimeter of carrier 39 made of a dielectric material such as a PVC tube, the sensing surface 199 of the permanent reference electrode 19 being situated at one end of the sensor 37. Protected wires 41, 175, 176 are brought out at the other end. The auxiliary metal electrode 17, for instance a cylindrical steel ring with an area of 500 cm$^2$, as well as the auxiliary metal electrode 40, for instance, a cylindrical steel ring with an area of 50 cm$^2$, have protective pipe coating simulated by sleeve 38 made of a dielectric material, such as a PVC tube.

FIG. 5 shows an embodiment similar to that of FIG. 3, the difference being that the electrolytic contact of the sensing surface 199 of the permanent reference electrode 19 with the surface of the auxiliary metal electrode 17 is provided by means of electrolytically conductive filling 42, for instance crystalline Na$_2$SO$_4$, and diaphragm 43 in the form of a cylinder with a diameter of, for instance, 10 mm inserted into cylindrical sleeve 44 made of a dielectric material, such as polyethylene, which is fixed in a hole provided in the auxiliary metal electrode 17 having, for instance, the shape of a circular plate with an area of 100 cm$^2$ and in the carrier 39 made of a dielectric material which also externally simulates the protective pipe coating in the form of a cylindrical ring. In its top part, the carrier 39 also supports a partition 56 made of electrically non-conductive material.

Figure 7:
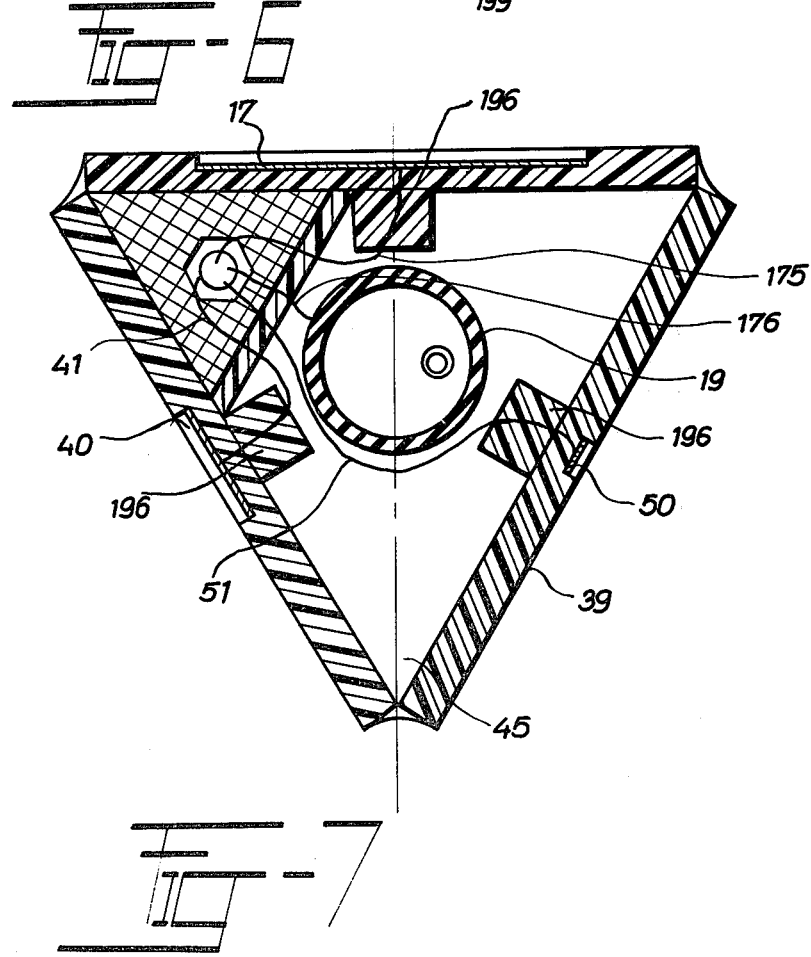
FIG. 7 is a transverse sectional view of the sensor shown in FIG. 6, taken along the cutting plane A—A therein.

FIG. 6 and FIG. 7 show another embodiment of the sensor 37 of this invention using three auxiliary metal electrodes 17, 40, 50 of the sensor 37 and one permanent reference electrode 19. When embedded in electrolyte 45, the sensing surface 199 of the permanent reference electrode 19 is electrolytically connected with the surfaces of auxiliary metal electrodes 17, 40 and 50 comprising, e.g., steel plates with areas of 1 cm², 10 cm², 100 cm², respectively.

FIG. 6 shows a longitudinal section through the sensor 37, transverse section A—A being shown in FIG. 7.

Sensors of this invention in the embodiments shown in FIGS. 3 through 7 may be used with advantage not only for measuring interference on coated metal structures, but also for the determination of the polarization potential using, for instance a switching technique.

The manner in which the sensor shown in, e.g., FIG. 1 is electrically connected to a structure such as the pipeling 1 the corrosion characteristics of which are to be measured, is illustrated in FIG. 8. In this FIGURE the numeral 3 denotes the sensor which is connected to the terminal box 10 via leads 175 and 176. The terminal lead 175 is electrically connected to the metal shell of the pipeline 1 via the connection 11 between terminals M and K within the terminal box 10. A high resistance voltmeter 12 is disposed within the terminal box 10 and connected across the leads 175 and 176. The distance L between the sensor 3 and the pipeline 1 is at least 6 times the radius R of said pipeline. Said distance L is also at least equal to 0.1 meter and not greater than 20 meters.

What is claimed is:

1. A system for determination of the electrolytic corrosion characteristics of a metal structure having a known surface area buried in an electrolyte in a current field, said system including a sensor comprising (i) at least one auxiliary metal electrode made of the same material as the measured metal structure and (ii) a permanent reference electrode, the auxiliary metal electrode forming a hollow cylindrical cavity, one end thereof having a closed metal bottom, said auxiliary electrode having a bare metal measuring surface area $S_1$, satisfying the relation $2.0 \text{ m}^2 \geq S_1 \geq 0.1 \text{cm}^2$, the other end thereof being fitted with an insulating shield, said permanent reference electrode being completely disposed within said hollow cavity.

2. A system for determination of the electrolytic corrosion characteristics of a metal structure having a known surface area buried in an electrolyte in a current field, said system including a sensor comprising (i) at least one auxiliary metal electrode made of the same material as the measured metal structure and (ii) a permanent reference electrode, the auxiliary metal electrode forming a hollow cylindrical cavity, one end thereof having a closed metal bottom, said auxiliary electrode having a bare metal measuring surface area S, satisfying the relation $2.0 \text{ m}^2 \geq S_1 \geq 0.1 \text{cm}^2$, the other end thereof being fitted with an insulating shield, said permanent reference electrode being completely disposed within said hollow cavity, the sensor being buried in the same electrolyte as the measured metal structure at a distance L from the measured metal structure, which distance satisfies the relation $20\text{m} \geq L \geq 0.1\text{m}$ and the relation $L \geq 6R$, where R is the radius of a hypothetical sphere having the same surface area as the measured non-linear structure, of the radius of a cylindrical linear structure.

3. The system of claim 1, wherein said auxiliary metal electrode has a bare metallic surface S of area $200 \text{ cm}^2 \leq S \leq 2.0 \text{ m}^2$ while $S_E \leq S_K/20$, where $S_K$ is the surface area of the metal structure.

4. The system of claim 3 wherein the cylindrical cavity formed by said auxiliary electrode has an elongated shape of circular cross-section satisfying the relations $2d \leq 1 \leq 20d$ and $M \geq d/2$, where d is the outside diameter and l the length of said metal electrode forming said cavity, while M is the distance from the bottom of the permanent reference electrode to the edge of the insulating shield, the length of the external part of the insulating shield being at least equal to the parameter M.

5. The system of claim 3 further comprising a watertight partition of an electrically insulative material having two sides disposed inside the auxiliary metal electrode forming said cavity, the permanent reference electrode being disposed through an opening in said partition.

6. The system of claim 1 further comprising an insulated wire electrically connected to the internal surface of the metal electrode and another insulated wire electrically connected to a copper electrode which constitutes a part of the permanent reference electrode, the two insulated wires being brought out of the cavity in the auxiliary metal electrode forming said cavity so that they pass through a cable bushing adjacent the permanent reference electrode and the insulating shield.

7. The system of claim 1, wherein L is the minimum distance between the surface of the auxiliary metal electrode forming said cavity and the surface of the metal structure of a spherical or cylindrical shape with radius R, but at least $L \geq 5$ m from the surface of a metal structure of an arbitrary shape.

8. The system according to claim 1, wherein said auxiliary metal electrode has a surface area S which satisfies the condition $1.0 \text{ m}^2 \geq S \geq 0.1 \text{ cm}^2$.

* * * * *